United States Patent

[11] 3,610,903

[72] Inventors Richard A. Stokes
West Chester, Pa.;
Vernon H. Tyger, Jr., Houston, Tex.;
Robert L. Davis, West Chester, Pa.; Ulbe
Faber, Honeybrook, Pa.

[21] Appl. No. 789,886
[22] Filed Jan. 8, 1969
[45] Patented Oct. 5, 1971
[73] Assignee Burroughs Corporation
Detroit, Mich.

[54] ELECTRONIC BARREL SWITCH FOR DATA SHIFTING
12 Claims, 9 Drawing Figs.

[52] U.S. Cl. .......... 235/154, 340/172.5, 340/347 DD, 235/92 SH
[51] Int. Cl. .......... G06f 5/00
[50] Field of Search .......... 340/347, 172.5; 235/154, 92; 328/37; 307/221

[56] References Cited
UNITED STATES PATENTS

| | | | |
|---|---|---|---|
| 3,141,153 | 7/1964 | Klein | 328/37 |
| 3,239,764 | 3/1966 | Verma et al. | 235/92 X |
| 3,350,692 | 10/1967 | Cagle et al. | 328/37 |
| 3,411,146 | 11/1968 | Knutson | 235/92 X |
| 3,374,463 | 3/1968 | Muir | 340/172.5 |

*Primary Examiner*—Maynard R. Wilbur
*Assistant Examiner*—Michael K. Wolensky
*Attorney*—Carl Fissell, Jr.

ABSTRACT: The disclosure of the present invention describes an electronic shift network, termed a barrel switch, which is comprised of a matrix of gates arranged in a rectangular configuration and adapted to shift in a single clock time a multibit parallel input a preselected number of places to the left or right, either end-off or end-around. The controls for operating the barrel switch are also described in detail.

INVENTORS. RICHARD A. STOKES
VERNON H. TYGER JR.
ROBERT L. DAVIS
ULBE FABER
BY Francis A. Varallo
AGENT INVENTORS. RICHARD A. STOKES
VERNON H. TYGER JR.
ROBERT L. DAVIS
ULBE FABER
BY Francis A. Varallo
AGENT INVENTORS. RICHARD A. STOKES
VERNON H. TYGER JR.
ROBERT L. DAVIS
ULBE FABER
BY Francis A. Varallo
AGENT

INVENTORS. RICHARD A. STOKES
VERNON H. TYGER JR.
ROBERT L. DAVIS
ULBE FABER

BY Francis A. Varallo
AGENT

INVENTORS. RICHARD A. STOKES
VERNON H. TYGER JR.
ROBERT L. DAVIS
ULBE FABER
BY
Francis A. Varallo
AGENT INVENTORS. RICHARD A. STOKES
VERNON H. TYGER JR.
ROBERT L. DAVIS
ULBE FABER
BY Francis A. Varallo
AGENT

ELECTRONIC BARREL SWITCH FOR DATA SHIFTING

BACKGROUND OF THE INVENTION

This invention relates generally to electronic barrel switches and more particularly to an electronic barrel switch using a plurality of levels of shifting.

Most data processing systems involve apparatus which is capable of shifting data words by various selectable amount and which is used for many operations performed by the system. It may be desirable to shift the word to the left or right, either end-off or end-around.

Shift registers have often been used to provide this capability but have had several recognized disadvantages. Among these is the fact that the time required for performing the shifting operation depends upon the number of places being shifted with longer shifts requiring greater amounts of time. This results in such frequently occurring operations as normalization and alignment often requiring relatively large amounts of time with a resulting decrease in the efficiency of the system.

Electromechanical and electronic barrel switches have also been used in order to shift data by varying amounts. These barrel switches, however, have had the problem of either being slow or requiring relatively complicated circuitry to provide the desired capabilities.

OBJECTS AND SUMMARY OF THE INVENTION

It is therefore an object of this invention to improve the apparatus for shifting words in data processing systems.

It is a further object of this invention to provide improved apparatus for shifting data by any amount in a single clock time.

It is a further object of this invention to provide a simplified barrel switch for shifting data to the right or left either end-off or end-around.

It is a further object of this invention to provide an improved barrel switch for shifting data by any selected amount either end-off or end-around in a single clock time.

It is still a further object of this invention to provide an improved method of packaging a barrel switch in order to minimize the number of types of multicircuit packages required for implementation.

In carrying out these or other objects of this invention there is provided apparatus for shifting data words by any selected amount to the right or left either end-off or end-around which includes a plurality of cascaded gating levels each level including a plurality of sets of gates, one set for each shift amount in that gating level. The outputs of corresponding gates in the sets of a level that are ORed together are connected to one gate in each set of the next gating level for gating data through to the next level shifted to the right by a selected amount. Also provided are controls which include means for translating a left shift count to an equivalent right shift count and means for decoding the shift count and right and left end-off signals for generating three groups of enabling signals to each set of each level for enabling all or part of one set of gates in each level. The first group of enabling signals is generated for any shift involving the set of gates to which the enabling signals are transmitted. The second group of enabling signals is generated for left end-off and end-around shifts involving the set of gates to which they are connected. The third group of enabling signals is generated for right end-off and end-around shifts involving the set of gates to which they are connected. In general, a barrel switch has $n$ levels of $m$ gates per level where $m^n$ is equal to the number of binary digits in the word being shifted. When shifting to the right, the right shift count is equal to the number of places to be shifted and may be represented by $$\sum_{i=0}^{n-1} a_i m^i, \text{ where } a_i=[0. . .(m-1)]$$

When shifting to the left, the left shift count is equal to the radix complement of the number of places to be shifted and may be represented by $$m^n - \sum_{i=0}^{n-1} a_i m^i$$

DESCRIPTION OF THE PREFERRED EMBODIMENTS

This invention can best be understood by referring to the following detailed description of the illustrated embodiments.

Figure 1:
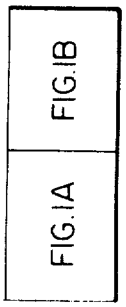
FIG. 1 is a composite of FIGS. 1A and 1B which constitute a representation of the gating levels of the barrel switch of the invention.
Figure 1B:
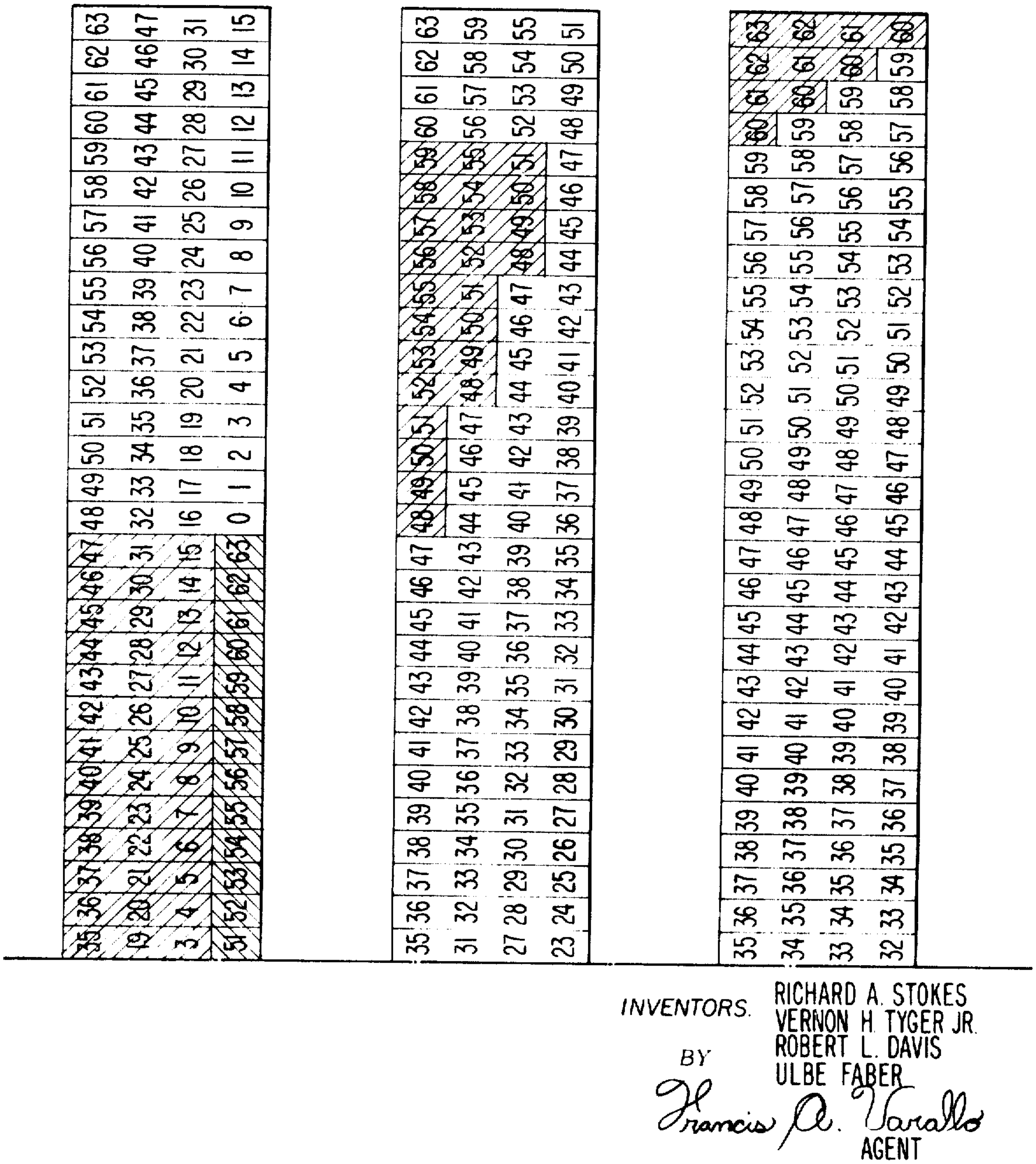
Figure 1A:
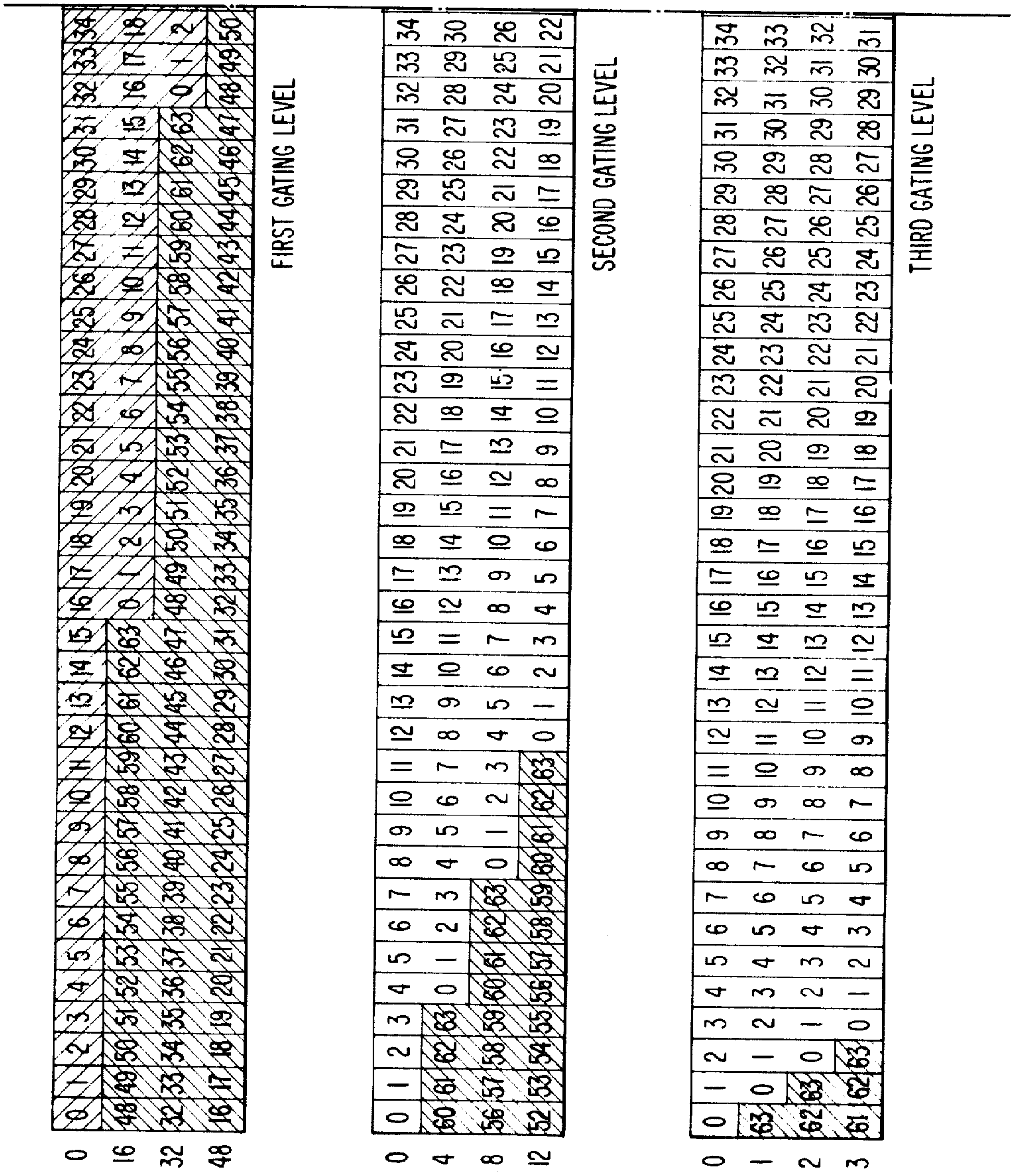

Referring now to FIG. 1 of the drawings, there is illustrated the gating levels for an embodiment of the invention which is designed to shift 64 bit words. Each number in the gating levels represents a single gate and the magnitude represents the bit position in the previous level from which it received its input. The first gating level contains four sets of gates (where a set is one row of a gating level) for shifting the bit received from the data source by either 0, 16, 32 or 48 places to the right. The second gating level also contains four sets of 64 gates for shifting the bits received from the first gating level by 0, 4, 8 or 12 places to the right. The third gating level contains four sets of 64 gates for shifting the bits received from the second gating level by either 0, 1, 2 or 3 places to the right. The output from the barrel switch is taken from the third gating level. It should be noted that only one set of gates in each level is ever enabled at any one time.

Figure 2:
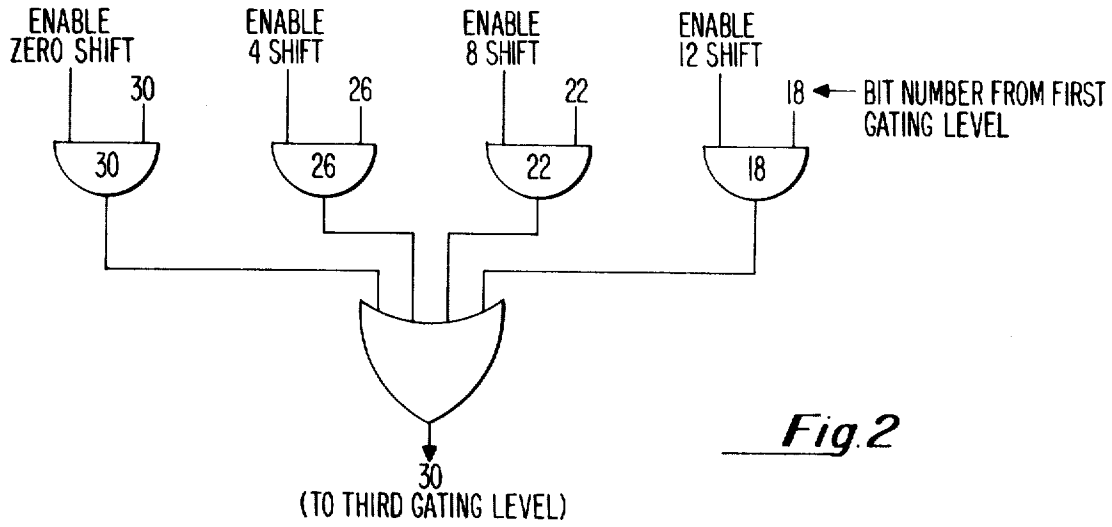
FIG. 2 is a logic diagram of a group of corresponding gates in one of the gating levels of the barrel switch of FIG. 1.

The outputs of the corresponding gates of the sets of gates in a level are ORed together as illustrated in FIG. 2 of the drawings. These gates are representative of one column or bit position of a gating level, where a bit position is numbered according to the bit input to the zero shift set. The numbers shown in FIG. 2 are for the gates in the 30th-bit position of the second gating level,, the AND gates 30, 26, 22 and 18 receive inputs from the gates in the 30th, 26th, 22nd, and 18th-bit positions respectively of the first gating level and also receive enable inputs for a 0 shift, a 4 shift, an 8 shift and a 12 shift respectively. The outputs of all the gates are ORed together and are connected in common to the gates numbered 30 appearing respectively in the four sets of gates in the third gating level.

With further reference to FIG. 1, in order to shift a word by means of a barrel switch, all or part of one set of gates in each level is enabled and the word to be shifted is transmitted to the input of the gates of the first gating level. The bits of the word to be shifted pass successively through the enabled sets of gates of the gating levels and are shifted on each level by the shift amount of the enabled set of gates. This shifting takes place because the outputs of each level are wired to each of the sets of a succeeding level shifted to the right by the shift amount of the various sets of gates. For instance, if the input word is to be shifted 18 places to the right the 16 shift set of gates of the first gating level, the zero shift set of gates of the second gating level and the 2 shift set of gates of the third gating level are enabled.

It must be noted however that while mention has been made of enabling, for example, the 16 shift set of gates of the first gating level, all of the gates in this set are not necessarily enabled. The reader will observe that in the illustration of FIG. 1, crosshatching has been employed to distinguish certain of the gates in each level. The crosshatching directed upward and to the right is designated "right crosshatching" and that directed upward to the left, "left crosshatching." In terms of the operations to be performed by the barrel switch, for a left end-off shift, the gates encompassed by the "left crosshatching" are not enabled. Likewise, for a right end-off shift, the gates within the "right crosshatching" are not enabled. For a left or right end-around shift, the crosshatching is inconsequential since all the gates of the selected shift set in a particular level are enabled. In the case of the 16 shift set of gates of the first gating level, for a right end-off shift, gates 48–63 inclusive would not be enabled, and for a left end-off shift, gates 0–31 inclusive would not be enabled. In either of these circumstances where these gates are not enabled, the selection of the 16 shift set of gates results in what may be regarded as a "0" output from the bit positions in which the respective gates reside. This is in contrast to the data or "1" output obtained from positions which contain the enabled gates.

As an example of barrel switch operation in which a right end-off shift of 18 places is desired, the path of the bit 0 of the word will be traced. From FIG. 1, it is seen that bit 0 is wired into the 0 gate of the 16-bit position of the 16 shift set of gates of the first gating level although it is also wired into the 0 bit position of the 0 shift set of gates, the 32nd-bit position of the 32 shift set of gates and the 48th-bit position of the 48th shift set of gates of the first gating level. These gates do not pass the bit since they are not enabled. From the output of the 16-bit position of the 16 shift set of gates of the first gating level, bit 0 of the word is wired into the 16-bit position of the 0 shift set of gates of the second gating level and passed to the 18th-bit position of the 2 shift set of gates of the third gating level. The outputs of the barrel switch are taken directly from the third gating level so that bit 0 of the word to be shifted has been shifted to the right by 18 bit positions. In the same manner each bit of the word is shifted to the right by 18 bit positions. Since the operation is right end-off, reference to FIG. 1 indicates that the right-directed crosshatched gates corresponding to bits 48–63 inclusive of the 16 shift set of gates of the first gating level are not enabled. Also the gates for bits 46 and 47 in the 16 shift set, are wired into the 62 and 63 bit positions respectively of the 0 shift set of the second gating level, and passed to the 0 and 1 bit positions of the 2 shift set of gates in the third gating level. However gates 62 and 63 are indicated as having a right-directed crosshatch and are not enabled when the other gates of the 2 shift set are enabled. Thus, for an 18 position right end-off shift, bits 46–63 inclusive of the 0–63 input word are shifted out and replaced by logical "0"s.

An additional example may be given to demonstrate end-around shifting. In this case, all of the crosshatched gates, both left and right crosshatched, are enabled whenever the barrel switch control selects a particular shift set of gates.

Assume that bit 48 of the input word is to be shifted 21 places to the right in an end-around carry. This operation involves the enabling of the 16 shift set of gates of the first gating level, the 4 shift set of gates of the second gating level and the 1 shift set of gates of the third gating level. Obviously the total number of shifts provided by the three levels is 21—the required number of places to be shifted.

Examining the first gating level and particularly the 16 shift set of gates, we find bit 48 of the input word is wired into gate 48 which resides in the 0 bit position. An output from the 0 bit position is wired into the 0 gate which appears in the 4 bit position of the 4 shift set of gates in the second gating level. An output from the 4 bit position of the second gating level is transferred to the 4 gate of the 1 shift set of gates in the third level. Since the 4 gate is included in the corresponding group of gates (numbered 5, 4, 3, 2) which make up the 5 bit position, the output from the third gating level signifies that the original 48 bit when shifted 21 positions to the right, comes to rest in the 5 bit position. end-off As a further example of the barrel switch action, consider a left end-off shift operation involving the shifting of the original bit 18 of the input word, 18 places to the left. In accordance with the equation given hereinbefore wherein the barrel switch controls for left shifts are equal to the radix complement of the number of places to be shifted, the switch controls are: 64−18=46. With continued reference to FIG. 1, in order to accomplish this shift, the 32 shift set of gates of the first gating level, the 12 shift set of gates of the second gating level and the 2 shift set of gates of the third gating level are enabled.

Thus, bit 18 which is to be shift 18 positions to the left is shown wired into the 50 bit position of the 32 shift set of gates of the first gating level. From the output of the 50 bit position of the 32 shift set of gates of the first gating level, bit 18 of the original input word is wired into gate 50 of the 12 shift set of gates of the second gating level. The enabling of the gates in the 12 shift position of the second gating level causes an output from gate 50 which resides in the 62 bit position. This output passes to gate 62 in the 2 shift set of gates in the third gating level. Since the last-mentioned gate 62 is in the 0 bit position, the output from gate 62, which is the output from the barrel switch indicates that the bit 18 has been shifted to the left to the 0 bit position —which represents the required 18-place shift to the left, chosen as an example.

In a left end-around operation, it is once again necessary to select the barrel switch controls in terms of the radix complement. Consider the reverse of the operation just completed, i.e., assume that it is required to shift bit number 5, 21 places to the left in an end-around shift. From the preceding it is apparent that bit number 5 should reside in the 48 bit position when the operation is completed.

The barrel switch controls are 64−21=43 which means that in the first level, the 32 shift set will be actuated, in the second level, 8 shift; and in the third level, 3 shift.

In the first level, 32 shift, bit number 5 of the input word appears in the 37 bit position of the switch. An output from this position is transferred to gate 37 of the 45 bit position of the second gating level. Finally, the output of the 45 bit position second gating level is passed on to gate 45 of the 3 shift position of the third gating level, which resides in the 48 bit position. The output from the third level is therefore the original bit number 5 which now appears in the 48 bit position as a result of a 21 bit left end-around shift.

Figure 3A:
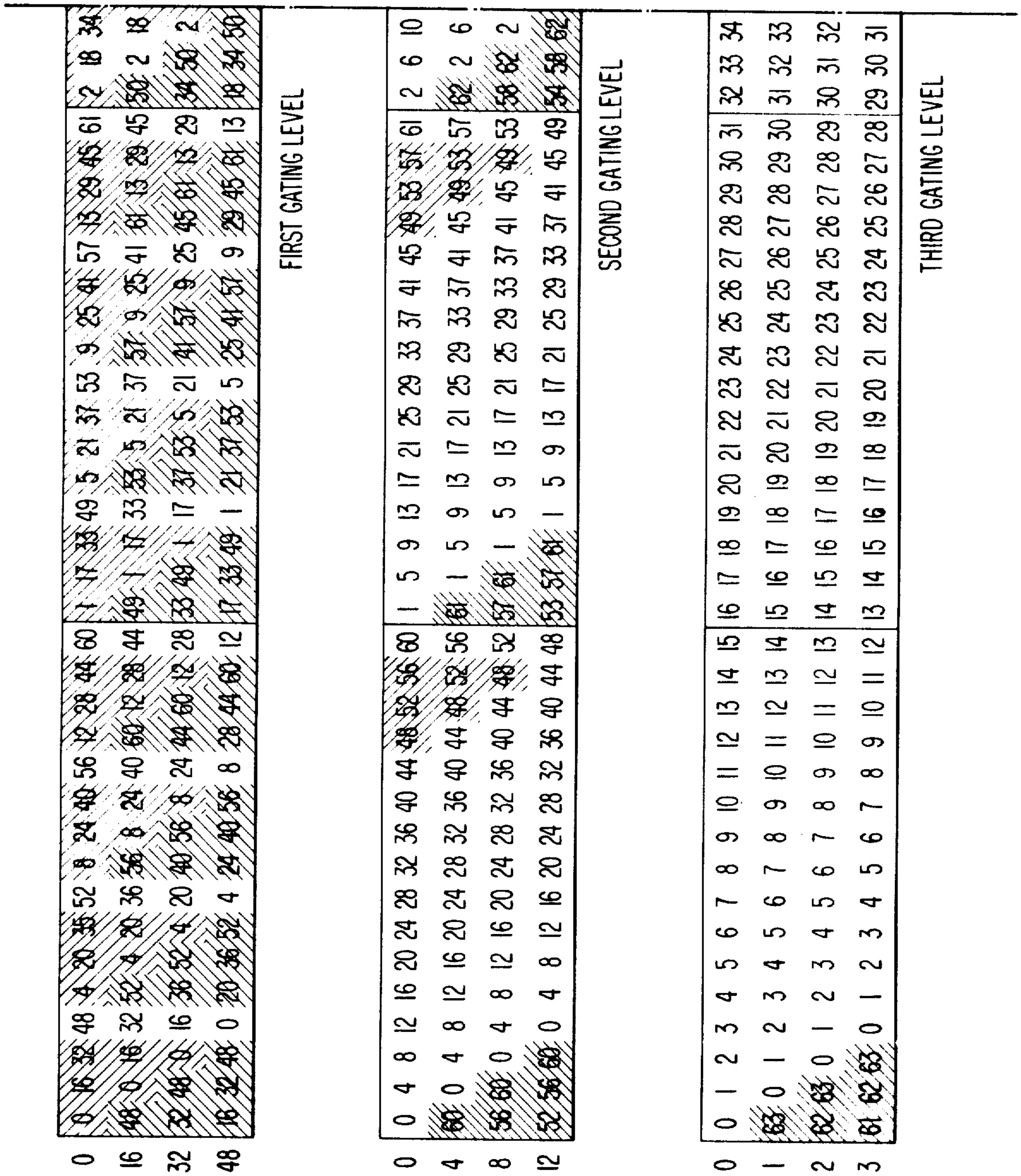
FIG. 3 is a composite of FIGS. 3A and 3B which constitute a preferred packaging arrangement of an actual operative embodiment of the barrel switch of FIG. 1.
Figure 3:
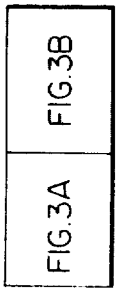
Figure 3B:
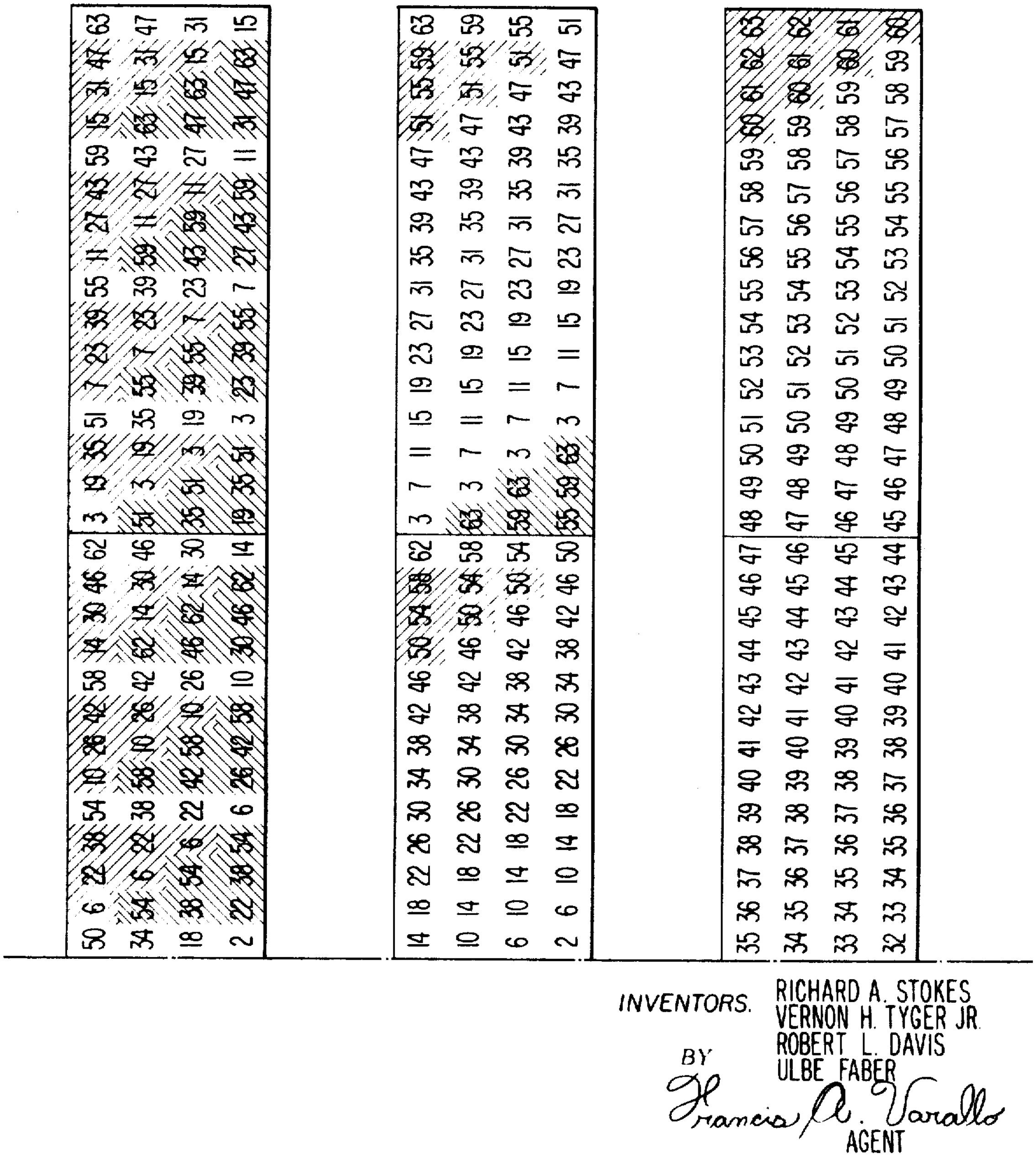

FIG. 3 shows a preferred embodiment of an actual packing arrangement of the barrel switch of FIG. 1, where each vertical line denotes an integrated circuit package division. Although the interlevel wiring is more complicated in the arrangement of FIG. 3 compared to that of FIG. 1, the FIG. 3 arrangement has the significant advantage of minimizing the types of circuit packages required. This results in the use of groups of identical interchangeable packages. Thus, the four packages in the first gating level are seen to be identical. The four packages in the second gating level are seen to be identical, and with a slight change in the external control wiring, this package can also be used for the middle two package positions in the third gating level. Also, with slight differences in the external control wiring, the packages needed for the ends of the third gating level are the same.

Figure 4:
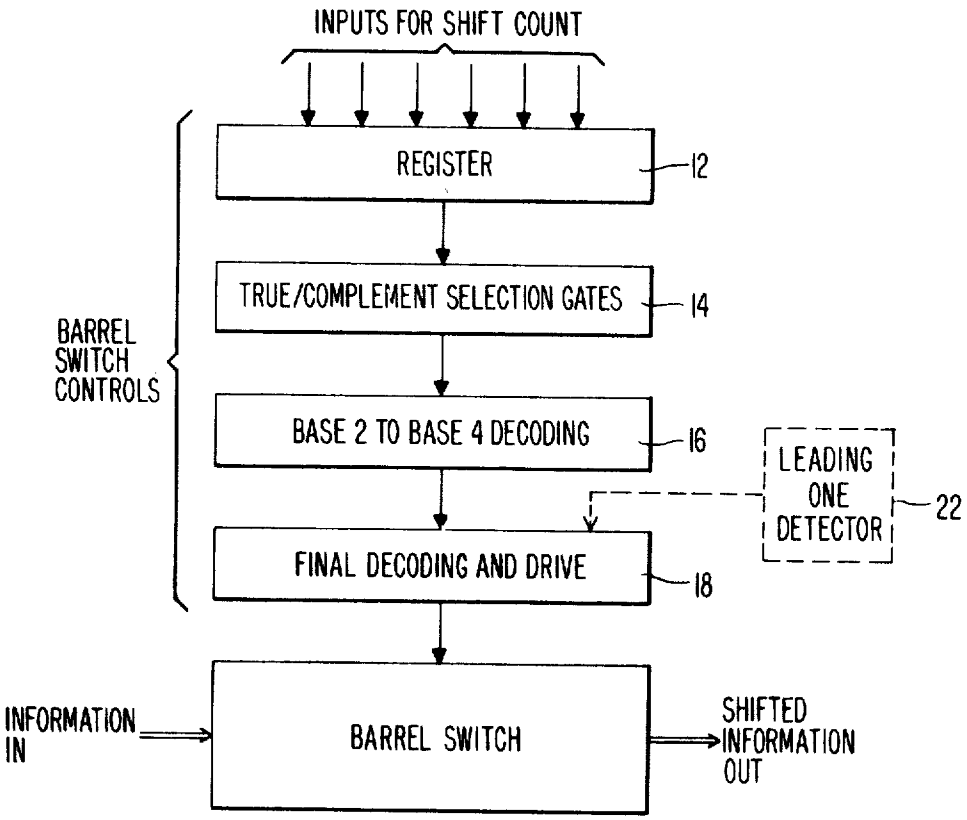
FIG. 4 is a block diagram of the control circuits for the barrel switch of FIG. 1.

FIG. 4 illustrates in block diagram form, the controls needed to operate the barrel switch of FIGS. 1–3 inclusive.

For all right shifts, the inputs to the REGISTER 12 are equal to the number of places to be shifted. The output of the register passes through the TRUE/COMPLEMENT SELECTION GATES 14 without alteration and becomes the input to the BASE 2 TO BASE 4 DECODING section 16. For all left shifts, the 2's complement of the number of places to be shifted must be the input to the BASE 2 TO BASE 4 DECODING section. This is accomplished by making the inputs to the REGISTER equal to the number of places to be shifted minus one. The output of the register is complemented in the TRUE/COMPLEMENT SELECTION GATES before being applied to the BASE 2 TO BASE 4 DECODING circuits.

The outputs from the BASE 2 TO BASE 4 DECODING stage are applied to the FINAL DECODING AND DRIVE circuits, the outputs of which are applied to predetermined groups of gates of the BARREL SWITCH as will be hereinafter explained in detail. It should be noted that under certain conditions, inputs to the FINAL DECODING AND DRIVE stage 18 are provided by a LEADING ONE DETECTOR, 22, designated, LOD. The LOD is a fast parallel logic network employed to detect the position of the most significant nonzero bit in the mantissa of a floating point word, which in turn supplies controls to the barrel switch for normalizing the mantissa. However, the inputs from the LOD are identically "0" if the LOD is not enabled, as is the case when the system is operating upon the inputs for shift count stored in the REGISTER.

Figure 5:
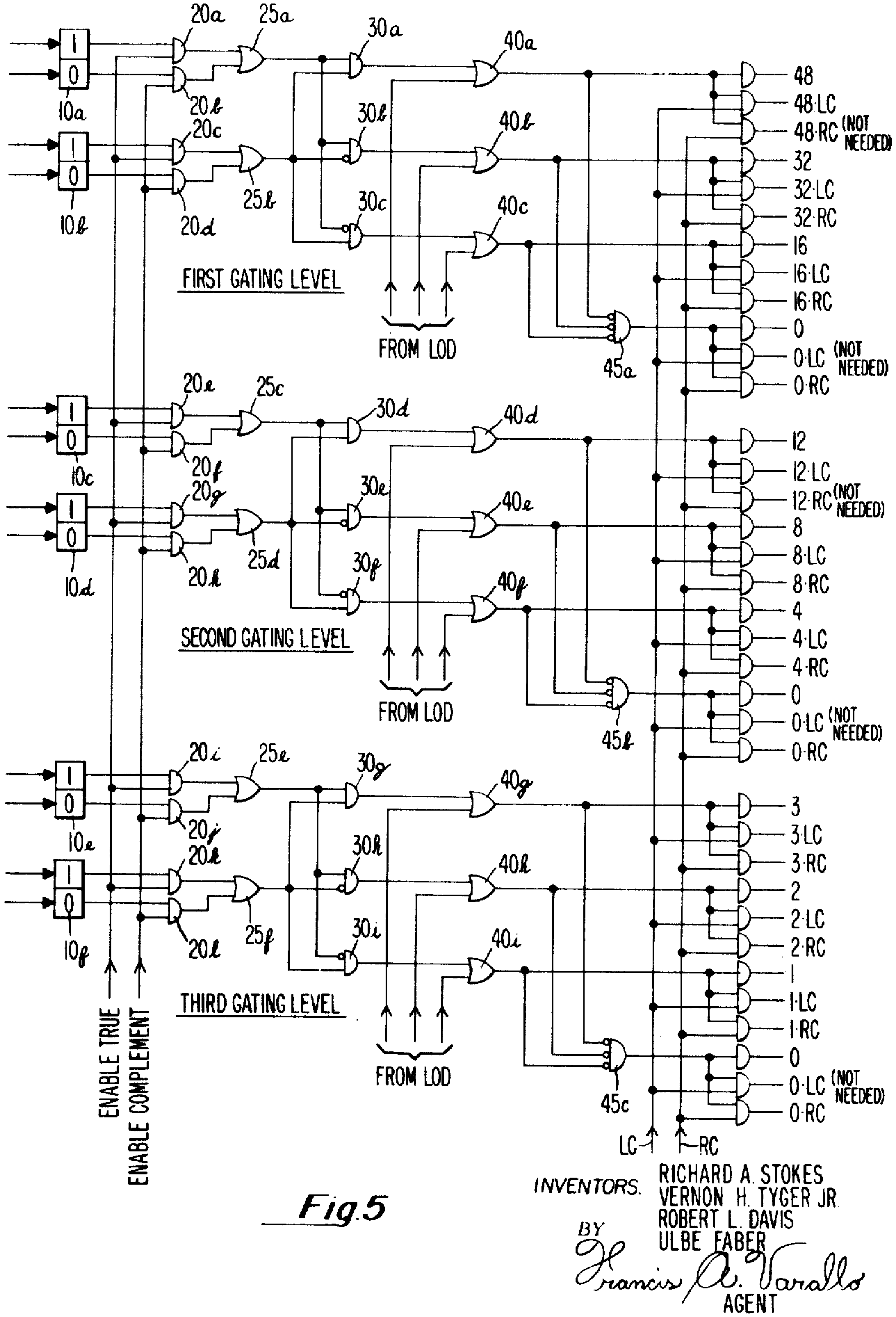
FIG. 5 is a detailed logic schematic of the barrel switch controls of FIG. 4.

FIG. 5 is a logical schematic of the barrel switch controls depicted in block form in FIG. 4. In connection with FIG. 5, reference should also be made to FIGS. 1–3 inclusive.

The six stage REGISTER for holding the binary number representative of the shift count is designated **10*a* through 10*f* inclusive, and may be of the flip-flop variety. Associated respectively with the register stages are pairs of AND gates, designated 20*a* through 20*l* inclusive, and an OR gate, 25*a* through 25*f* inclusive. For example, register 10*a* has associated with it AND gates 20*a*, 20*b* and OR gate 25*a*. These gates comprise the TRUE/COMPLEMENT SELECTION GATES of FIG. 4. The AND gates 20, associated with a particular register stage receive respectively one input from opposite sides of the flip-flop 10**, and a second input from either of the lines designated ENABLE TRUE and ENABLE COMPLEMENT. The former line is enabled whenever a right shift is to be performed; the latter, whenever a left shift is to be executed.

The register stages **10*a* and 10*b* and their associated gates 20*a*, 20*b*, 25*a* and 20*c*, 20*d* and 25*b* are part of the control circuit for the gates of the "first gating level" of FIGS. 1 and 3. Similarly register stages 10*c* and 10*d* and their associated gates apply to the "second gating level." Register stages 10*e* and 10*f*** are part of the controls for the "third gating level."

The outputs of the pair of OR gates 25 for each gating level are combined in various combinations in three AND gates designated generally **30*a*–30*i* inclusive. The latter gates perform form the BASE 2 TO BASE 4 DECODING function mentioned in FIG. 4. The outputs of the AND gates 30 for each gating level are ORed together in gates 40 with signals from the LEADING ONE DETECTOR, LOD, and are applied to a plurality of AND gates which are conveniently identified in FIG. 5 by a notation signifying the shift set of gates and the particular gates within the shift set that will be enabled. Additional AND gates 45*a*, 45*b* and 45*c* operate upon the outputs of the gates 40 in each gating level and may be considered part of the FINAL DECODING AND DRIVE section. The inputs to these gates 45** are inverted thereby and the outputs thereof are applied in each gating level to the three AND gates associated with the zero shift set of gates.

It will be observed in FIG. 5 that signals from two control lines designated LC for left control and RC for right control are also applied to the gates of the FINAL DECODING AND DRIVE section. The significance of these control lines will be best understood from a consideration of the following.

With reference to FIG. 1, it will be noted that each gating level of the barrel switch may be thought of as comprising three sections, which may be designated for convenience as Section A, Section B and Section C. Section A includes all of the gates which bear the right-directed crosshatch. As indicated hereinbefore, this section is not enabled when shifting right end-off. Stated alternately, Section A is enabled when not shifting right end-off. Section B covers all those gates which have no crosshatching. Hence, Section B is enabled when shifting end around (either right or left), right end-off, or left end-off. Section C covers the gates within the left-directed crosshatch. Section C indicates the section that is not enabled when shifting left end-off, or stated another way, is enabled when not shifting left end-off.

The LC, left control and RC, right control lines function as follows. Assume that we wish to shift left end-off. Section A with the right-directed crosshatch must be enabled and this is accomplished by enabling the LC line. Further, if the shift is to be right end-off, the gates of Section C with the left-directed crosshatch must be enabled, and this is accomplished by enabling the RC line. Assuming further that an end-around shift, either left or right is desired, both the LC and RC lines are enabled concurrently. The gates of Section B are enabled for a right or left end-off shift or an end-around shift, and this occurs when either LC or RC is enabled. Since the logic of the system in which the barrel switch is used, will cause either LC or RC or both to be enabled at any given time, the gates of Section B will always be enabled and no control is required for this Section.

As an example of the operation of the barrel switch controls depicted in FIG. 5, assume that a right end-off shift of six places is desired. The number "six" in binary form (000110) is placed in the register stages **10*a* through 10*f*, the most significant bit appearing in 10*a*; the least significant bit, in 10*f*. Thus the flip-flops of stages 10*a*, 10*b*, 10*c* and 10*f* are placed in the "0" state and 10*d* and 10*e*** in the "1" state.

For the purpose of the present explanation, it will be assumed that the output from the side of the register stage corresponding to the state in which the register resides, is a "1" signal. Thus, in stage **10*a* which is in the "zero" state, the output from the "zero " side of a stage is a "1" and is applied to one of the input terminals of gate 20*b*. The output of the "one" side of register state 10*a* is a "0" and appears as an input to gate 20*a*. Similarly, in stage 10*d*, the "one" side provides a "1" output signal to gate 20*g*, while the "zero" side, produces a "0" signal input for gate 20*h***.

Since a right shift is to be performed, the ENABLE TRUE line will be activated, thereby providing a "1" signal to all of the gate inputs to which the line is connected. Under these circumstances, the ENABLE COMPLEMENT line is not energized, and this is equivalent to providing a "0" signal to all of the gates connected to this line.

Having established this signal convention, consider the first gating level. The outputs of AND gates **20*a*–20*d* inclusive, and OR gates 25*a*, 25*b* are all "0." Likewise the outputs of AND gates 30*a*–30*c* inclusive are also "0." It is noted that the output from gate 25*a* applied to 30*c* is inverted at the input of the latter gate. Similarly the output from gate 25*b* is inverted at the input of gate 30*b*. As explained hereinbefore, when the LOD is not enabled, as in the present case, the lines therefrom are all at "0" signal level. Therefore the outputs from OR gates 40*a*–40*c* inclusive are all "0." The latter are applied to AND gate 45*a*, where they are each inverted at the input thereof. Therefore, the output of gate 45*a*** is a "1."

As explained hereinbefore, for a right end-off shift, the RC, right control, line must be enabled. This provides a "1" signal to all of the gates connected thereto. The LC, left control, line is not enabled and "0" signals appear as inputs to all of the gates serviced by this line.

The sets of gates in the barrel switch enabled by the controls depends upon the output of the gates of the FINAL DECODING AND DRIVE section. It was pointed out hereinbefore that each gating level could be broken down into Sections A, B and C. Actually, such designation may also be applied to each shift set of gates in a particular gating level. Thus, with respect to the gates of the FINAL DECODING AND DRIVE section of FIG. 5 the notations adjacent the output terminals signify the groups of gates in the barrel switch which are enabled in response to a "1" signal appearing on such terminals. For example the notation "48" identifies the noncrosshatched (Section B) group of gates in the 48 shift set of gates and a "1" output from this gate signifies the enabling of barrel switch gates 0–15 inclusive (See FIG. 1). A "1" output from the gate identified as 48·LC enables the right-directed crosshatched group of gates in the 48 shift set of gates. This last group is shown in FIG. 1 as comprising gates 16–63 inclusive. In like manner, gate 48·RC would be effective in enabling a left-directed crosshatched group in the 48 shift set, if such a group were present. However, reference to FIG. 1 indicates that there are no left-directed crosshatched gates in the 48 shift set, and gate 48·RC is not needed. The same is true for the 0·LC gate of each gating level and the 12·RC gate of the second gating level. The reason for the presence of the "not needed" gates in FIG. 5 is that in an actual operative embodiment all of the gates are arranged in three identical integrated circuit modules, one module for each gating level. The output terminals from those gates "not needed" are left open circuited. This practice has the production advantage of the use of only one type of circuit module, interchangeable for the three gating levels.

Continuing with our example of right end-off shift of six places, the RC line is enabled, and considering the outputs of gates 40*a*–40*c* inclusive, and 45*a*, the output of the gates of the FINAL DECODING AND DRIVE section associated with the 48, 32 and 16 shift sets are all "0." In the zero shift set of the first gating level, the outputs of gates 0 and 0·RC are each "1." (Gate 0·LC is not needed, as explained hereinbefore.) Thus, with reference to FIG. 1, gate 0 has enabled gated 48–63 inclusive and gate 0·RC has enabled gates 0–47 inclusive.

In the second gating level, the outputs of gates 25*c* and 25*d* are "0" and "1" respectively which results in "0" outputs from gates 30*d* and 30*e* and "1" output from gate 30*f*. The outputs of 40*d* and 40*e* are "0"; output from 40*f* is a "1." AND gate 45*b* has a "0" output. Under these conditions the FINAL DECODING AND DRIVE gates of the second gating level produce outputs as follows. All of the gates associated with the 12, 8 and 0 shift sets of gates, have "0" outputs. In the 4 shift sets of gates, the gates designated 4 and 4·RC have "1" outputs and the 4·LC gate has a "0" output. Again referring to FIG. 1, we find that in the second gating level, the 4 gate of the barrel switch controls has enabled barrel switch gates 0–47 and 56–59, both groups inclusive. Similarly the 4·RC gate has enabled gates 48–55 inclusive. Gates 60–63 inclusive, under control of the 4·C gate are not enabled.

In the third gating level, gates 25*e* and 25*f* have "1" and "0" outputs respectively. Gates 30*g* and 40*g*, and 30*i*, 40*i* have "0" outputs; gate 30*h* and 40*h* have "1" outputs. In the FINAL DECODING AND DRIVE section, gate 45*c* has a "0" output. The remaining gates have the following outputs. The gates associated with the 3, 1 and 0 shift sets of gates all have "0" outputs. Barrel switch control gates 2 and 2·RC have "1" outputs and 2·LC has a "0" output. In FIG. 1, third gating level, gates 0–59 are enabled by gate 2 and gates 60, 61 by gate 2·RC. Gates 62 and 63 are not enabled.

It will be apparent from the foregoing description of the invention and its mode of operation that there is provided an improved barrel switch. It should be understood that modification of the arrangement described herein may be required to fit particular operating requirements. Such modifications will be apparent to those skilled in the art. The present invention is not considered limited to the embodiment chosen for purpose of disclosure, and covers all changes and modifications which do not constitute departures from the true spirit and scope of this invention. Accordingly, all such variations as are in accord with the principles discussed previously are meant to fall within the scope of the invention.

We claim:

1. An electronic barrel switch for shifting a data word by a desired amount comprising a plurality of cascaded gating levels, each level including more than two sets of gates, each of said sets of gates being associated with a particular shift amount in one of said gating levels, means for entering said data word into one of said sets of gates in accordance with said desired amount of shifting, means for ORing together the outputs of corresponding gates representative of a bit position of said data word within one of said gating levels and applying said outputs in common to a gate in each set of gates of a succeeding gating level, said outputs being shifted to the right by the shift amount of each set of gates in said last-mentioned gating level, and control means comprising a register for storing the shift count, true/complement selection gates operatively connected to said register and being effective in translating a left shift count to an equivalent right shift count, decoding means connected to said selection gates for converting the output thereof from base $r$ to base $m$ where $r$ is the base of the number representing the shift count stored in said register and $m$ corresponds to the number of sets of gates in each of said gating levels, and final decoding and drive circuits connected to said decoding means and adapted to supply enabling signals to predetermined groups of gates within each set of gates depending upon whether said desired shifting is to be left end-off, right end-off or left or right end-around.

2. A barrel switch as defined in claim 1 further characterized in that said data word is comprised of 64 bits, said register having six stages for storing the shift count and said decoding means being adapted to perform a base 2 to base 4 decoding operation upon the output of said true/complement selection gates.

3. A barrel switch as defined in claim 2 wherein for right shift operations, said shift count stored in said register comprises the binary representation of the number of places to be shifted.

4. A barrel switch as defined in claim 3 wherein for left shift operations, said shift count stored in said register comprises the binary representation of the number of places to be shifted minus one, said true/complement selection gates complementing the output of said register and applying the complemented shift count to said decoding means.

5. An electronic barrel switch for shifting a data word by a desired amount to the right or left either end-off or end-around comprising a plurality of cascaded gating levels, each level including more than two sets of gates, a set of said gates being associated with a particular shift amount in one of said gating levels, means for entering said data word into one of said sets of gates in accordance with said desired amount of shifting, means for ORing together the outputs of corresponding gates representative of a bit position of said data word within one of said gating levels and applying said outputs in common to a gate in each set of gates of a succeeding gating level, said outputs being shifted to the right by the shift amount of each set of gates in said last-mentioned gating level, the gates within each gating level being functionally grouped into three sections whereby each set of gates contains gate members of at least two of said sections, control means operatively connected to said sets of gates for providing enabling signals to the gates of preselected ones of said sections in accordance with the desired type of shift operation, said control means providing enabling signals to the gates of a first of said sections for shifting the bits of said data word left end-off, said control means providing enabling signals to the gates of a second of said sections for shifting the bits of said data word right end-off, and said control means providing enabling signals to the gates of a third of said sections for shifting the bits of said data word left or right end-around, right end-off and left end-off.

6. An electronic barrel switch as defined in claim 5 wherein said data word to be shifted is comprised of $m^n$ bits where $n$ is the number of gating levels and $m$ is the number of sets of gates in each of said gating levels.

7. A barrel switch as in claim 6 further characterized in that said data word is comprised of 64 bits and that there are first, second and third gating levels, each level having four sets of gates.

8. A barrel switch as defined in claim 7 further characterized in that the gates of each of said gating levels are of the integrated circuit variety, the gates of said first and second gating levels being arranged in four integrated circuit packages per level and being positioned within such packages such that homologous gates are members of the same one of said sections, the gates of said third gating level being arranged in four integrated circuit packages, all of the gates of two of said last-mentioned packages being members of the same one of said sections, the gate configuration of the remaining two packages for said third level differing from each other and those of the other levels, said arrangement of gates minimizing the number of types of integrated circuit packages utilized by said barrel switch.

9. An electronic barrel switch for shifting a 64 bit data word by a desired amount comprising first, second and third cascaded gating levels, each level including four shift sets of gates, the shift sets of gates of said first gating level providing respectively shift amount of 0, 16, 32 and 48, the shift sets of gates of said second gating level providing respectively shift amounts of 0, 4, 8 and 12, the shift sets of gates of said third gating level providing respectively shift amounts of 0, 1, 2 and 3, means for entering said data word into one of said shift sets of gates in said first gating level in accordance with said desired amount of shifting, means for ORing together the outputs of corresponding gates representative of a bit position of said data word within one of said gating levels and applying said outputs in common to a gate in each set of gates of a succeeding gating level, control means operatively connected to said sets of gates in each gating level for enabling predetermined ones of said gates within each set of gates in accordance with the desired shifting operation, the bits of said data word passing successively through the enabled gates of the sets of gates in each gating level in response to said control means and being shifted on each gating level by the shift amount of the enabled set of gates, the shifted output data from said barrel switch being available directly from said third gating level.

10. A barrel switch as defined in claim 9 further characterized in that said control means comprise a six-stage bistable register for storing the binary representation of the total shift count, a pair of said stages being associated with each gating level, each of said stages having a pair of output terminals, true/complement selection gates coupled to each register stage and comprising a pair of AND gates and an OR gate, each AND gate having a pair of input terminals and an output terminal, one of said input terminals of each of said AND gates being connected to one of said pair of register stage output terminals, the other input terminals of said AND gates being coupled respectively to separate sources of true/complement enable signals, means cooperating with said signal sources for applying one of said enable signals to said last-mentioned AND gates depending upon whether the desired shift is to be left or right, the outputs of each said pair of AND gates being applied to their associated OR gate, decoding means for performing a base 2 to base 4 conversion, said decoding means comprising three AND gates each having a pair of input terminals and an output terminal, the outputs of the pair of OR gates associated with the true/complement selection gates of each gating level being applied in common to the respective input terminals of said AND gates of said decoding means, the input signals to two of the decoding AND gates being inverted thereby, final decoding and drive circuits comprising a plurality of AND gates and being adapted to provide at least one enable signal to said predetermined ones of said gates within each set of gates, said predetermination of gates being effected by left/right control enable signals provided by a source thereof and applied to the AND gates of said final decoding and drive circuits.

11. An electronic barrel switch for shifting a data word by a desired amount comprising at least a single gating level, said level including more than two sets of gates, each of said sets of gates being associated with a particular shift amount in said gating level, means for entering said data word into a selected one of said sets of gates in accordance with said desired amount of shifting, means for ORing together the outputs of corresponding gates representative of a bit position of said data word within said gating level, the outputs from said selected one of said sets of gates being shifted to the right by said desired amount, and control means comprising a register for storing the shift count, true/complement selection gates operatively connected to said register and being effective in translating a left shift count to an equivalent right shift count, decoding means connected to said selection gates for converting the output thereof from base *r* to base *m* where *r* is the base of the number representing the shift count stored in said register and *m* corresponds to the number of sets of gates in said gating level, and final decoding and drive circuits connected to said decoding means and adapted to supply enabling signals to predetermined gates within said sets of gates.

12. An electronic barrel switch as defined in claim 11 wherein said final decoding and drive circuits supply an enabling signal to all of the gates in said selected one of said sets of gates to effect end-around shifting of said data word.